3,344,080
REFRACTORY OXIDES DOPED WITH SILICON CARBIDE AND SILICON NITRIDE
David Thomas Livey and John Sidney O'Neill, Abingdon, England, assignors to United Kingdom Atomic Energy Authority, London, England
No Drawing. Filed June 21, 1965, Ser. No. 465,728
Claims priority, application Great Britain, Sept. 16, 1964, 37,914/64
10 Claims. (Cl. 252—301.1)

The present invention relates to the production of sintered bodies having a fine grain size.

It is well known that dense bodies of many substances may be fabricated from porous powder compacts by sintering. However, sintering is often accompanied by grain growth and such growth leads to a reduction in the strength of the body. If however grain growth is restricted, the sintered body produced will have a small grain size and, as a result, the strength of the body will be high. Furthermore, with suitable restriction of grain growth, the strength of the body will increase with increasing density without showing the considerable reduction in strength which occurs in high density bodies as grain-growth occurs.

It is the object of the present invention to provide a new or improved method of restricting grain growth in sintered bodies.

According to the present invention there is provided a method of restricting grain growth in sintered bodies comprising mixing together a powder of a base material and a powder of silicon carbide or silicon nitride, shaping such mixture and heating said shaped mixture to produce a sintered mass having a maximum grain size of the order to 10 microns.

It should be appreciated that the effect of restricting grain growth is obtained from the powdered silicon compound and the silicon carbide or nitride powder used should be of very fine dimensions, desirably of sub micron dimensions, for example less than 0.5 micron.

Although it is known to mix silicon carbide with other ceramic materials, e.g. beryllia (United Kingdom patent specification No. 956,911) to produce sintered bodies, it has not previously been proposed to limit the grain size of a sintered body by the use of a silicon carbide addition to the base material of the sintered body.

The base material may be a refractory oxide, for example, beryllia, alumina, magnesia, zirconia, uranium dioxide and thoria. It may prove possible to use other materials, such as carbides, or metals as the base material but it should be appreciated that the present invention can be applied only to those materials which are unreactive towards silicon carbide and silicon nitride and which do not possess any mutual solubility with silicon carbide or silicon nitride.

The use of the silicon compounds for restricting grain growth may also be extended to bodies having more than one constituent, for example dispersed nuclear fuels such as uranium dioxide spheres in a beryllia matrix. In such a case, either or both the phases might benefit from a grain growth restriction, for example, silicon carbide could be mixed with the uranium dioxide in the production of the uranium dioxide spheres to result in fine grained spheres which could then be dispersed in a beryllia matrix to which silicon carbide had been added in order to obtain a fine grained matrix material, but it is probable that treatment of the matrix material would be sufficient.

The shaping of the mixture may be effected by any of the known techniques such as pressing, slip-casting and extrusion, and may be combined with the heating process, for example by hot pressing.

In general, the strength of a sintered body is dependent on the grain size and increases as grain size decreases. With a beryllia base powder, it appears that the strength increases until a grain size of 1–5 microns is attained and that little further increase in strength will be obtained with grain sizes below 1 micron. For good strength characteristics, a grain size of not greater than 10 microns is desirable for most base materials, although with some base materials, for example beryllia, an even smaller grain size might be preferred. The requirement for a small grain size however, should be consistent with other properties, such as density and impermeability being satisfactory.

It should be appreciated that the present invention does not prevent grain-growth on heating to a sintering temperature, it merely restricts the extent of such growth. Thus, using pure beryllia, or, preferably, beryllia containing a small quantitiy, about 1% by weight, of magnesia to assist densification, the final grain size on sintering is in the range 30–100 microns. However, using silicon carbide or silicon nitride additions to the base material, it is possible to restrict the grain size of the final body to less than 5 microns. However, the particle size of the starting material is considerably smaller than 5 microns and is usually of sub-micron size and thus it can be seen that some grain growth is occurring even in the presence of the silicon compounds but that the extent of such grain growth is considerably reduced.

The extent of the grain growth restriction is dependent on two factors, the volume of silicon carbide or nitride addition and the mean particle size of the silicon carbide or nitride powder. It is to be expected that up to a certain level, the restrictive effect would increase with the increase in the amount of silicon carbide or silicon nitride added and, at constant addition, would increase as the particle size of the silicon carbide and silicon nitride was reduced, and qualitatively these effects have been found. Thus, the grain growth can be controlled either by the addition of more silicon carbide or nitride, or the same quantity of silicon carbide or nitride, but of smaller particle size, in order to obtain a smaller grain size in the sintered body. It is preferred to use the minimum possible quantity of the silicon compounds having regard to the maximum grain size which is acceptable in the sintered body, and thus it is desirable to use a silicon carbide or nitride powder having the smallest possible particle size.

Several embodiments of the present invention are set forth in the following examples.

*Examples 1–3*

A fine beryllia powder (grain size about 0.01 micron) containing one percent by weight of magnesia to improve sinterability was divided into three parts. To one part no addition was made and to the other parts additions of one and ten percent by weight of silicon carbide powder were added. The silicon carbide powder had a surface area of 8 sq. metres/gm. and was in the form of platelets about 0.5 micron diameter and less than 0.1 micron thick. The three separate parts of beryllia were otherwise treated in the same manner.

Prior to the addition of the silicon carbide powder, the three separate parts of beryllia were sieved and an organic binder added, a prefered binder being that sold under the trade name Cranco diluted with trichlorethylene. The additions of silicon carbide were effected simultaneously with the addition of the binder and the whole mass was mixed, dried and resieved. The mixture was then cold-compacted using a pressure in the range 10,000–50,000 p.s.i., to form specimen rods about ¼ inch square and 1¼ inches in length. These rods were sintered for 4 hours at 1750° C. in a nitrogen-hydrogen atmosphere, dried by passing over silica gel followed by magnesium perchlorate, and the sintered bodies machined to 0.17 inch square by 1 inch long for the purposes of testing. All the specimens sintered to 97–98% of theoretical density but possessed considerable differences in grain size and consequently in strength as measured by a three-point transverse bend test. The results are summarised in Table I.

TABLE I

| Example | SiC content (wt. percent) | Grain size (microns) | Strength (p.s.i.) |
|---|---|---|---|
| 1 | Nil | 30 | 22,000 |
| 2 | 1 | 12 | 30,000 |
| 3 | 10 | <3 | 50,000 |

*Examples 4–7*

The process of Examples 1–3 was repeated using mixes containing beryllia, 1% by weight of magnesia and increasing amounts of sub-micron silicon carbide. The material sintered to about 98% of the theoretical density after 4 hours at 1750° C. and was subsequently annealed for 100 hours in a nitrogen-hydrogen atmosphere.

The results obtained are summarised in Table II.

TABLE II

| Example | SiC content (wt. percent) | Grain size (microns) | |
|---|---|---|---|
| | | Sintered | Annealed |
| 4 | 1 | 11.5 | 25.5 |
| 5 | 3.4 | 6.5 | 9.6 |
| 6 | 8 | 3.6 | 5.3 |
| 7 | 15.6 | 2.5 | 4.0 |

It will be seen from Table II that additions of up to 15.6 weight percent of silicon carbide result in grain growth restriction to greater extents but that the effect of a 15.6% addition shows only a slight improvement over the effect obtained with an 8% addition.

It will also be observed that the restraint on grain-growth was maintained even after annealing, particularly with the material having the higher silicon carbide content.

*Examples 8–10*

In these examples, the amount of silicon carbide added was kept constant at 10% by weight and the particle size of the carbide powder was varied. The mixtures were sintered and annealed as in the previous examples and the results obtained are summarised in Table III.

TABLE III

| Example | SiC particle size | Grain size (microns) | |
|---|---|---|---|
| | | Sintered | Annealed |
| 8 | Below 1 micron | 2–3 | 4–6 |
| 9 | 5–25 microns | 5–8 | 10–15 |
| 10 | 25–65 microns | 5–8 | 35–40 |

It will be seen from Table III that the restrictive effect is dependent not only on the presence of silicon carbide but also on the form in which the silicon carbide is present and that a satisfactory restrictive effect is obtained only with a silicon carbide powder having a small particle size.

*Example 11*

A mix of beryllia containing 1 weight percent of magnesia and 8 weight percent of silicon carbide, the latter being of sub-micron particle size, was hot pressed for one hour at a pressure of 2000 pounds per square inch and a temperature of 1500° C. The product had a grain size of 3–5 microns and a density of about 99% of theoretical. The strength of this material was found to be as high as 65,000 pounds per square inch.

*Example 12*

The electrical resistivity of a sample having a composition similar to that of the mix of Example 11 was found to be in excess of $20 \times 10^6$ megohms. A similar sample of pure beryllia was found to have a similar resistance.

*Examples 13–15*

The process of Examples 1–3 was repeated using silicon nitride powder of particle size 0.1–0.5 micron instead of silicon carbide.

The results obtained are summarised in Table IV.

TABLE IV

| Example | Silicon nitride (wt. percent) | Grain size (microns) | Strength (p.s.i.) |
|---|---|---|---|
| 13 | Nil | 30 | 22,000 |
| 14 | 1 | 12 | 36,000 |
| 15 | 10 | 4 | 52,000 |

It was found that in no case did the addition of effective quantities of silicon carbide or silicon nitride cause any discontinuities to be introduced into the microstructure. Thus, the silicon carbide and silicon nitride give a grain growth restriction effect without producing any noticeable deleterious effects in the sintered beryllia body.

We claim:
1. A method of restricting grain growth in sintered bodies comprising the steps of:
   (a) mixing a fine powder of a refractory oxide selected from the group consisting of beryllia, alumina, magnesia, zinconia, uranium dioxide and thoria with less than 10% by weight of a sub-micron size grain growth restricting material selected from the group consisting of silicon carbide and silicon nitride;
   (b) shaping such mixture to form a shaped body; and
   (c) heating said shaped body to produce a sintered body having a maximum grain size of about 10 microns.

2. A method according to claim 1 wherein the base material comprises beryllia and the grain growth restricting material is present in an amount of at least 1% by weight.

3. The method of claim 2 wherein the shaped body is formed by cold pressing at from 10,000 to 50,000 p.s.i.

4. The method of claim 2 wherein the base powder is beryllia containing one percent by weight of magnesia.

5. A method according to claim 2 wherein the grain growth restricting material is silicon carbide of a particle size less than 0.5 micron.

6. A method according to claim 2 wherein the grain growth restricting material is silicon nitride.

7. A sintered body having a grain size of less than 10 microns and consisting essentially of a refractory oxide selected from the group consisting of beryllia, alumina, magnesia, zinconia, uranium dioxide and thoria and less than 10% by weight of a sub-micron size grain growth inhibitor selected from the group consisting of silicon carbide and silicon nitride intimately dispersed throughout said body.

8. A sintered body of beryllia according to claim 7.

9. A sintered body according to claim 8 wherein the inhibitor is silicon carbide.

10. A sintered body according to claim 8 wherein the inhibitor is silicon nitride.

(References on following page)

References Cited

UNITED STATES PATENTS

| | | | |
|---|---|---|---|
| 3,164,483 | 1/1965 | McCreight | 106—44 |
| 3,165,417 | 1/1965 | Turner | 160—57 X |
| 3,214,499 | 10/1965 | Burnham | 264—.5 |

FOREIGN PATENTS 956,911  4/1964  Great Britain.

BENJAMIN R. PADGETT, *Primary Examiner.*

A. J. STEINER, *Assistant Examiner.*